United States Patent [19]

Miller et al.

[11] Patent Number: 5,325,727
[45] Date of Patent: Jul. 5, 1994

[54] APPARATUS AND METHOD FOR MEASURING THE MASS FLOW RATE OF LIQUID FROM A VESSEL

[75] Inventors: Steven A. Miller, Amsterdam, N.Y.; Peter G. Frischmann, Scottsdale, Ariz.; Neil A. Johnson, Schenectady, N.Y.

[73] Assignee: General Electric Company, Schenectady, N.Y.

[21] Appl. No.: 28,869

[22] Filed: Mar. 10, 1993

[51] Int. Cl.$^5$ .............................................. G01F 1/42
[52] U.S. Cl. .................................................. 73/861.61
[58] Field of Search ................ 73/861, 861.42, 861.50, 73/861.61, 215, 216

[56] References Cited

U.S. PATENT DOCUMENTS 4,554,687 11/1985 Laryer et al. ........................ 73/216
5,154,513 10/1992 Beer ................................. 73/861.61

FOREIGN PATENT DOCUMENTS 1126474 9/1968 United Kingdom ............. 73/861.61

OTHER PUBLICATIONS

Marketing Literature, Computer Instruments Corporation, 1000 Shames Drive, Westbury, NY 11590.

Primary Examiner—Herbert Goldstein
Attorney, Agent, or Firm—James Magee, Jr.

[57] ABSTRACT

The method and apparatus of this invention is related to measuring a flow rate of a liquid having a density $\rho$ from a vessel having an inner cavity and a pouring channel. A flow sensor introduces a first gas flow into the liquid in the cavity at a first position, the inner cavity having a cross-sectional area $A_1$ at the first position, and a second gas flow into the liquid in the pouring channel at a second position, the pouring channel having a cross-sectional area $A_2$ at the second position, there being a vertical distance z between the first and second positions. A transducer provides an output signal proportional to a pressure differential $p_1-p_2$ between the first and second gas flows. A processor receives the output signal and determines the liquid flow rate m through the pouring channel according to the proportional relation $$m \propto \rho A_2 \left[ \frac{2\left(\frac{(p_1 - p_2)}{\rho} + gz\right)}{\left(1 - \frac{A_2^2}{A_1^2}\right)} \right]^{\frac{1}{2}}$$

where g is gravity.

11 Claims, 2 Drawing Sheets

APPARATUS AND METHOD FOR MEASURING THE MASS FLOW RATE OF LIQUID FROM A VESSEL

This application is related to copending application Ser. No. 08/042,911, filed Apr. 5, 1993.

This invention relates to an apparatus and method for measuring the flow rate of liquid poured from a vessel, for example, the flow rate of liquid metal from a bottom pouring crucible.

BACKGROUND OF THE INVENTION

The mass flow rate of liquid being poured from a vessel is an important parameter in a number of processes, such as the casting or the atomization of liquid metals. Improved process control can be provided with an accurate, substantially instantaneous measurement of the liquid metal flow rate poured from the vessel. However, conventional flow rate sensors such as venturi meters, ultrasonic probes, turbine sensors, and vibrating tube mass flow meters are unsuitable for measuring the flow rate of corrosive or high temperature liquids, such as molten metals. Therefore, there is a need for an apparatus for measuring the flow rate of aggressive, corrosive, or high temperature liquids.

To meet this need the National Institute of Standards and Technology has initiated a program to develop a method and apparatus utilizing an eddy current sensor for measuring the flow rate of liquid metal. For example, see "Eddy Current Liquid Metal Flow Rate Sensor," L. C. Phillips, A. H. Kahn, NIST/Industrial Consortium on Intelligent Processing of Rapidly Solidified Metal Powders by Inert Gas Atomization, Semi-Annual Report, Mar. 1 to Aug. 31, 1992, pp. 13–17, National Institute of Standards and Technology, Gaithersburg, Md.

An aspect of this invention is to provide a method and apparatus for measuring the flow rate of a liquid from a continuously filled vessel having a pouring channel.

Another aspect of this invention is to provide a method and apparatus for measuring the mass flow rate of aggressive, corrosive, or high temperature liquids from a vessel having a pouring channel.

BRIEF DESCRIPTION OF THE INVENTION

The method of this invention provides for measuring a mass flow rate of a liquid having a density $\rho$ from a vessel having an inner cavity and a pouring channel. The method comprises providing a first gas flow into the liquid in the cavity at a first position, the inner cavity having a cross-sectional area $A_1$ at the first position. Providing a second gas flow into the liquid in the pouring channel at a second position, the pouring channel having a cross-sectional area $A_2$ at the second position, there being a vertical distance $z$ between the first and second positions. Determining a pressure differential $p_1-p_2$ between the first and second gas flows, and determining the liquid flow rate m through the pouring channel according to the proportional relation, $$m \propto \rho A_2 \left[ \frac{2\left(\frac{(p_1 - p_2)}{\rho} + gz\right)}{\left(1 - \frac{A_2^2}{A_1^2}\right)} \right]^{\frac{1}{2}}$$

where g is gravity.

The apparatus for measuring the mass flow rate of the liquid is comprised of a vessel having an inner cavity for containing the liquid and a pouring channel. A flow sensor for introducing a first gas flow into the liquid in the cavity, and a second gas flow into the liquid in the pouring channel, and providing an output signal proportional to a pressure differential between the first and second gas flows. A processor receives the output signal and determines the liquid flow rate through the channel.

BRIEF DESCRIPTION OF THE DRAWINGS

The following description of the invention will be understood with greater clarity if reference is made to the following drawings.

DETAILED DESCRIPTION OF THE INVENTION

The method and apparatus of this invention can be used to measure the flow rate of liquid metal from a vessel, such as a crucible in a liquid metal atomization process. By refilling the crucible with liquid metal before it empties, the atomization process can be performed continuously to produce large quantities of metal powder. The flow rate of liquid metal from the crucible can be measured by the method and apparatus of this invention not only during the steady state pouring from the crucible, but also during the non-steady state condition occurring when the crucible is refilled with the liquid metal. Although the method and apparatus of this invention is described below using the molten metal atomization process as an example, the method and apparatus can be used in other liquid pouring processes. In addition, the description below provides the method of determining the mass flow rate of liquid from a vessel, however, it should be obvious to those skilled in the art that the volumetric liquid flow rate can also be determined.

Figure 1:
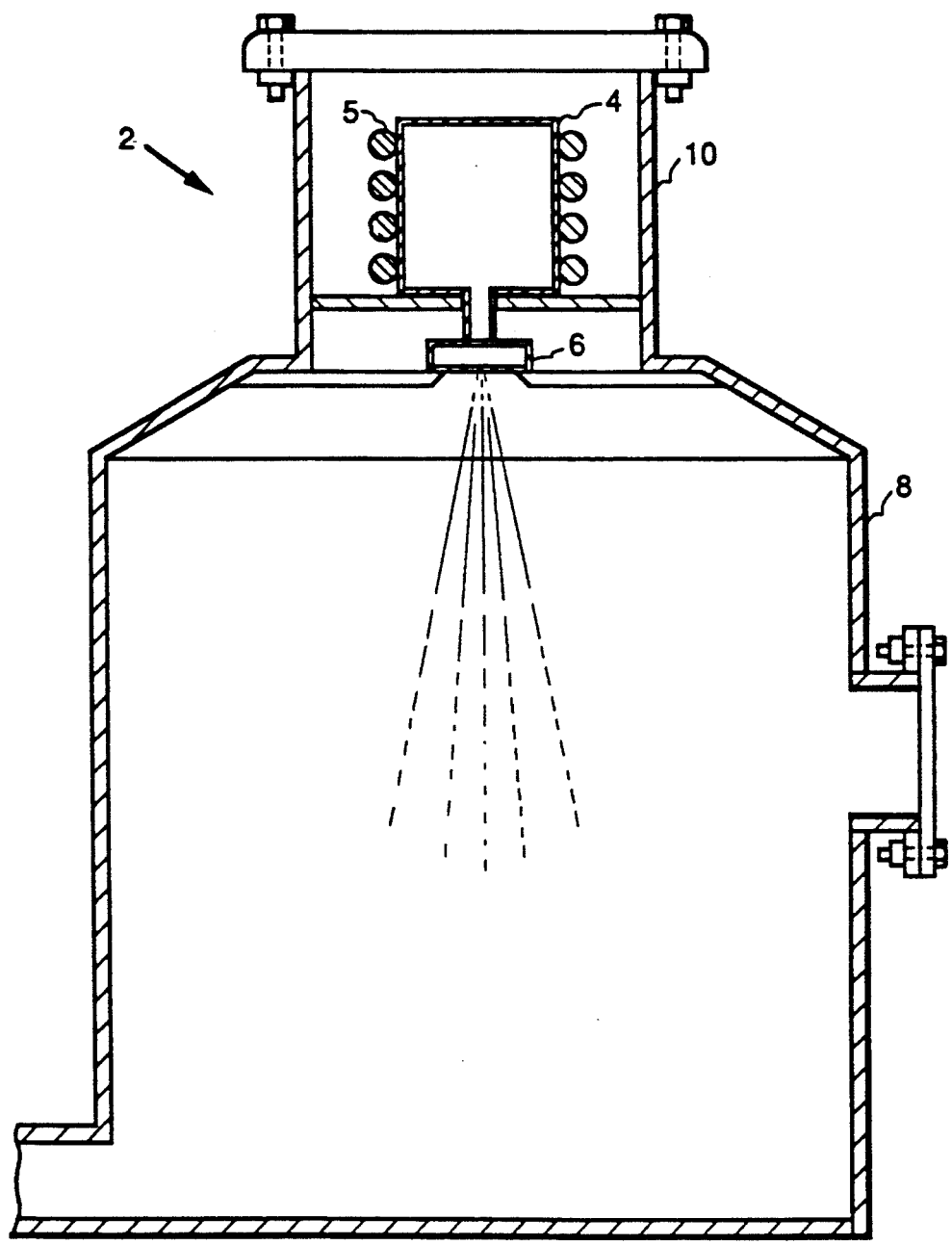
FIG. 1 is a schematic view of an apparatus for atomizing liquid metal.

Referring to FIG. 1, an apparatus 2 for atomizing liquid metal is shown. The apparatus 2 is comprised of a crucible 4, a nozzle 6, and an enclosure 8. The crucible 4 is formed of suitable material for holding the liquid metal, e.g. ceramic such as alumina or zirconia, or water cooled copper. A conventional heating means such as element 5 can be positioned for heating the molten metal therein. The molten metal in crucible 4 can be heated by any suitable means, such as an induction coil, plasma arc melting torch, or a resistance heating coil. The crucible 4 has a bottom pouring channel coupled with a melt guide tube in nozzle 6. The liquid metal is poured from the crucible 4, through the nozzle 6 conventionally mounted on atomization enclosure 8.

A suitable crucible enclosure 10 can be formed over the crucible 4 to contain an inert atmosphere for the liquid metal. A conventional gas supply means, not shown, can be coupled with the crucible enclosure 10 to provide an inert atmosphere therein. A stream of liquid metal poured from crucible 4 is directed through the nozzle 6. The nozzle 6 directs the stream of liquid metal into a jet of atomizing gas having a conical shape converging in the stream below the nozzle. The liquid metal stream is atomized by the gas jet forming a plume of molten metal droplets which are rapidly quenched to form solid particulates of the metal. A substantially instantaneous measurement of the liquid flow rate from the crucible 4 through the nozzle is an important process parameter that can be used to improve control of the process.

Figure 2:
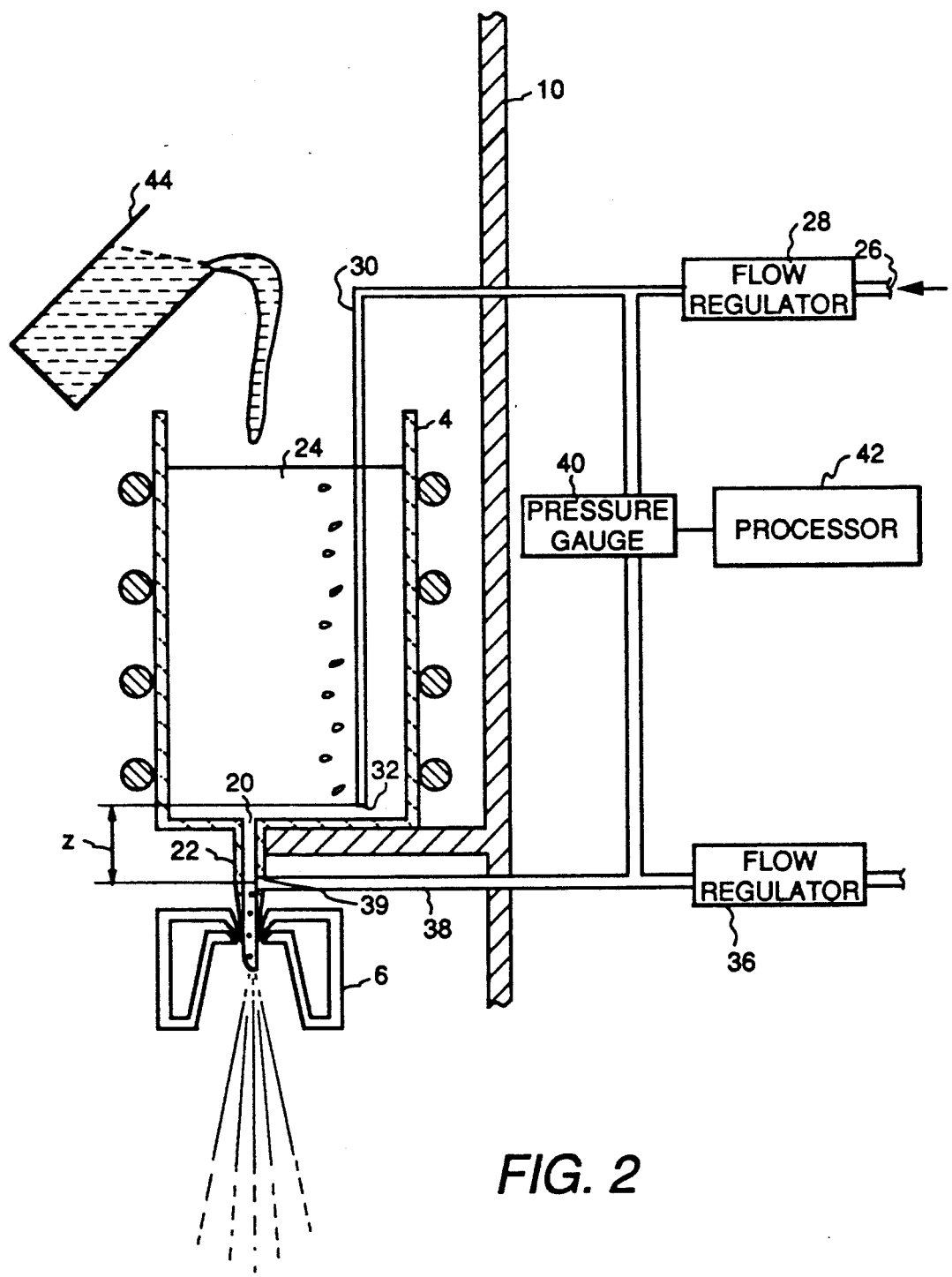
FIG. 2 is a schematic view of an apparatus for measuring the flow rate of liquid metal from a bottom pouring vessel in the atomizing apparatus.

Referring to FIG. 2, the crucible 4 defines an inner cavity 24 suitable for holding the liquid metal. A flow sensor 26 provides a first gas flow into the liquid metal in the cavity 24, and a second gas flow into the liquid metal in the pouring channel 20. The flow sensor 26 is comprised of a first and a second conventional gas supply, not shown, operatively coupled to a first and a second conventional gas flow regulator 28 and 36, to provide a preselect gas flow to a first tube 30, extending into the cavity 24, and a second tube 38 extending into the pouring channel 20. At least the portion of the first tube 30 extending into the cavity 24 is formed from a material resistant to the liquid metal, such as the material used to form the crucible 4. For example suitable tube materials for high melting temperature superalloys are alumina or boron nitride, while stainless steel can be used for low melting temperature metals such as lead.

The first tube 30, preferably extends through the top of the crucible 4 into the cavity 24 to minimize back-up of the liquid in the crucible into the first tube. However, the first tube 30 may extend through the sidewall of the crucible 4 into the cavity. The first tube 30 extends to a first position within the cavity 24, that is below the surface of the liquid in the cavity. The cavity 24 having a cross sectional area $A_1$ at the first position 32. Preferably, the first position 32 is at a location within the cavity spaced from the pouring channel where liquid flow within the cavity is minimized during pouring, e.g., close to the sidewall of the crucible furthest from the pouring channel 20.

The liquid metal is poured from the crucible 4 through a pouring channel 20. The pouring channel can be formed as a bore extending through the bottom or sidewall of the crucible 4. The pouring channel, can be extended through a melt guide tube 22 extending from the crucible 4. The melt guide tube 22 directs the stream of molten metal into the nozzle 6 for atomization. A second gas supply is coupled to a second gas flow regulator 36. The regulator 36 is coupled to a second tube 38 extending into the pouring channel 20 at a second position 39. The pouring channel 20 has a cross sectional area $A_2$ at the second position 39.

Preferably, the second position 39 is at a location in the pouring channel where the liquid flow is substantially laminar. For example, the second position 39 can be intermediate the melt guide tube 22. The second tube extending through the melt guide tube in communication with the pouring channel 20 extending therethrough. The second gas supply provides the second gas flow through the second tube 38 into the stream pouring through the pouring channel 20. The first and second positions are separated by a vertical distance z, i.e., the difference in depth from the top surface of the liquid in the cavity 24.

A transducer 40, for example a conventional strain gauge differential pressure transducer, is coupled in a conventional manner with the first tube 30 and second tube 38 to measure the differential gas pressure $p_1-p_2$ between the first and second gas flows. The transducer 40 provides an output signal proportional to the differential gas pressure $p_1-p_2$ of the first and second gas flows in the first and second tubes. A signal processor 42, is coupled with the transducer to receive the output signals and determine the liquid metal flow rate m through the pouring channel 20 according to a proportional relation, $$m \propto \rho A_2 \left[ \frac{2\left(\frac{(p_1-p_2)}{\rho} + gz\right)}{\left(1 - \frac{A_2^2}{A_1^2}\right)} \right]^{\frac{1}{2}},$$

where g is gravity, and $\rho$ is the density of the liquid.

It should be understood that the single differential pressure transducer can be replaced with a first transducer coupled to the first tube 30, and a second transducer coupled to the second tube 38. The output signal from each transducer can be sent to the processor 42 to determine the pressure differential. The processor 42 can be comprised of a differential operating amplifier to accept the analog signal from the transducer, or a conventional microprocessor or computer having an analog to digital converter.

Preferably, the first and second gas flow regulator 28 and 36 provide a constant gas flow rate through the first and second tubes sufficient to cause continuous formation and release of bubbles from the tubes into the liquid. For example, when the liquid is molten metal, a suitable gas flow rate for the first tube is about 45 to 190 cubic centimeters per minute. When the gas flow rate is too low, the liquid metal can back up the tubes, for example during transitions such as the startup of the atomizing gas. If the liquid metal penetrates to a cold portion of the tube, it can solidify and block the gas flow therethrough. In addition, a low gas flow rate can cause excessive variation in the pressure determined by the transducer 32 from unstable formation of the bubbles exiting the tubes into the liquid. When the gas flow rate is too high, there can be excessive splashing from bubbles exiting the liquid surface in the vessel. In addition, a high gas flow can cause the pressure drop along the length of the tubes to be significant enough to mask the pressure or pressure differential being measured by the transducer.

Preferably, the first and second tubes have an inside diameter suitable to provide the continuous gas flow therethrough as discussed above, without permitting liquid to back up the tubes. For example, when the liquid is molten metal, a suitable inside diameter for the first tube is about 1 to 9 millimeters. When the inside diameter is too low, the pressure drop along the length of the tube from the continuous gas flow is too great, and the pressure changes in the gas flow from the liquid metal flow are masked. When the inside diameter is too large, the liquid metal can back up the tubes despite the continuous gas flow.

Preferably, the gas flow in the second tube is limited to prevent the bubbles formed in the pouring channel from interfering with the liquid metal flow rate therethrough. The inside diameter of the second tube is limited to provide for the gas flow rate that prevents liquid from backing up the tube without interfering with the liquid flow through the pouring channel. Preferably, the inside diameter of the second tube is about 7 to 25 percent, more preferably about 8 to 15 percent, of the inside diameter of the pouring channel.

In operation, the flow regulators 28 and 36 provide a gas flow through the first and second tubes into the cavity 24, and the pouring channel 20, respectively, to prevent the liquid metal from backing up the first and second tubes. A liquid metal having a density $\rho$ is poured from a melting vessel 44 into crucible 4. A stopper, not shown, is removed from channel 20, and the liquid metal is poured therethrough. The melt guide tube 22 directs the stream of molten metal from channel 20 to nozzle 6 for atomization. The gas flow regulators 28 and 36 preferably provide a constant gas flow rate into the liquid. The gas escapes from the first tube 30 and second tube 38 into the liquid metal as gas bubbles passing therethrough. Preferably, the gas is inert to the liquid metal.

As the level of the liquid metal in the crucible 4 changes from pouring or refilling, the hydrostatic pressure of the liquid metal in the cavity 24 decreases or increases. As a result, the pressure $p_1$ of the gas flow through the first tube 30 decreases or increases. Similarly, as the flow rate of liquid metal through the melt guide tube 22 changes, the pressure $p_2$ of the gas flow through the second tube 38 changes. The transducer 40 provides an output signal proportional to the differential pressure $p_1-p_2$ between the first tube 30 and second tube 38, respectively. The processor 42 receives the output signal, and determines the liquid metal flow rate m through the melt guide tube 22 according to the proportional relation, $$m \propto \rho A_2 \left[ \frac{2\left(\frac{(p_1 - p_2)}{\rho} + gz\right)}{\left(1 - \frac{A_2^2}{A_1^2}\right)} \right]^{\frac{1}{2}},$$

where g is gravity.

The determination of the liquid flow rate from the second flow sensor provides the flow rate independent of refilling the crucible from the vessel 44 during pouring. By assuming that the velocity of the liquid poured from the vessel 44 into the crucible 4 has been dissipated by the liquid in the crucible before the liquid passes by the first position, only gravity accelerates the liquid from the first position to the second position in the pouring channel. Assuming the liquid is inviscid, and does not compress the proportional relation can be based upon the changes in the potential energy, kinetic energy, and the work done on the melt. In other words, the total energy of the liquid at the first position, plus the work done on the liquid as it passes from the first position to the second position equals the energy of the liquid at the second position.

What is claimed is:

1. A method for measuring a flow rate of a liquid having a density $\rho$ from a vessel having an inner cavity and a pouring channel, comprising:

providing a first gas flow rate into the liquid in the cavity at a first position, the inner cavity having a cross-sectional area $A_1$ at the first position;

providing a second gas flow rate into the liquid in the pouring channel at a second position, the pouring channel having a cross-sectional area $A_2$ at the second position, there being a vertical distance z between the first and second positions;

determining a pressure differential $p_1-p_2$ between the first and second gas flows; and determining the liquid flow rate m through the pouring channel according to the proportional relation, $$m \propto \rho A_2 \left[ \frac{2\left(\frac{(p_1 - p_2)}{\rho} + gz\right)}{\left(1 - \frac{A_2^2}{A_1^2}\right)} \right]^{\frac{1}{2}}$$

where g is gravity.

2. A method according to claim 2 wherein the liquid is molten metal, and the first gas flow is at a rate of about 45 to 190 cubic centimeters per minute.

3. A method according to claim 2 wherein the second position is at a location in the pouring channel where the liquid flow is substantially laminar.

4. A method according to claim 3 wherein the first position is at a location in the cavity where the liquid flow is minimized.

5. Apparatus for measuring the flow rate of a liquid, comprising:

a vessel having an inner cavity for containing the liquid and a pouring channel;

a flow sensor introducing a first gas at a first flow rate into the liquid in the cavity at a first position, and a second gas at a second flow rate into the liquid in the pouring channel at a second position, there being a vertical distance between the first and second positions, and providing an output signal proportional to a pressure differential between the first and second gas flows, and a processor for receiving the output signal and determining the liquid flow rate through the channel.

6. An apparatus according to claim 5 wherein the flow sensor is comprised of a first gas supply coupled to a first gas flow regulator, and the first regulator is coupled to a first tube extending into the cavity, and a second gas supply coupled to a second gas flow regulator, and the second regulator is coupled to a second tube extending into the pouring channel, and a transducer coupled to the first and second tubes for providing the output signal.

7. An apparatus according to claim 6 wherein the transducer is comprised of a first transducer coupled to the first tube for providing a first pressure signal proportional to the first gas pressure, and a second transducer coupled to the second tube for providing a second pressure signal proportional to the second gas pressure.

8. An apparatus according to claim 7 comprising a pouring tube extending from the vessel, and the pouring channel extends through the pouring tube.

9. An apparatus according to claim 8 wherein the second tube extends into the pouring tube.

10. An apparatus according to claim 9 wherein the first tube has an inner diameter of about 1 to 9 millimeters, and the second tube has an inner diameter of about 7 to 25 percent of the pouring channel.

11. An apparatus according to claim 10 wherein the first tube extends into the cavity at a location where liquid flow is minimized.

* * * * *